United States Patent
Chelian et al.

(10) Patent No.: US 10,315,492 B2
(45) Date of Patent: Jun. 11, 2019

(54) AUTOMATIC AIR QUALITY MONITORING AND IMPROVEMENT SYSTEMS

(71) Applicant: Toyota Motor Engineering & Manufacturing North America, Inc., Erlanger, KY (US)

(72) Inventors: Suhas E. Chelian, San Jose, CA (US); Tiffany Chen, San Jose, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 1 day.

(21) Appl. No.: 15/595,786

(22) Filed: May 15, 2017

(65) Prior Publication Data

US 2018/0326811 A1    Nov. 15, 2018

(51) Int. Cl.
*B60H 1/00* (2006.01)
*G01C 21/00* (2006.01)

(52) U.S. Cl.
CPC ......... *B60H 1/008* (2013.01); *B60H 1/00771* (2013.01); *G01C 21/005* (2013.01)

(58) Field of Classification Search
USPC .......................................................... 701/36
See application file for complete search history.

(56) References Cited

U.S. PATENT DOCUMENTS

| | | | |
|---|---|---|---|
| 6,078,853 A | 6/2000 | Ebner et al. | |
| 7,805,224 B2 | 9/2010 | Basson et al. | |
| 8,229,624 B2 | 7/2012 | Breed | |
| 8,350,722 B2 | 1/2013 | Tewari et al. | |
| 8,704,669 B2 | 4/2014 | Strumolo | |
| 8,892,354 B2 | 11/2014 | Rakshit | |
| 8,907,803 B2 | 12/2014 | Martin | |
| 9,449,514 B2 * | 9/2016 | Schunder | G08G 1/096775 |
| 2008/0033644 A1 | 2/2008 | Bannon | |
| 2016/0214458 A1 | 7/2016 | Dhas | |
| 2016/0280160 A1 | 9/2016 | MacNeille et al. | |
| 2016/0290979 A1 | 10/2016 | Cogill et al. | |

FOREIGN PATENT DOCUMENTS

| | | |
|---|---|---|
| WO | WO03000513 | 1/2003 |
| WO | WO2007064269 | 6/2007 |
| WO | WO2015160830 | 10/2015 |

* cited by examiner

*Primary Examiner* — Maceeh Anwari
(74) *Attorney, Agent, or Firm* — Snell & Wilmer LLP

(57) ABSTRACT

Methods, systems, and apparatus for controlling air filtration, circulation, climate control and/or other adjustable components. The air control system includes an air filtration or circulation unit for filtering or circulating air. The air control system includes a navigation unit for providing at least one of a navigational map information or environment information including a current location of the vehicle. The air control system includes an electronic control unit connected to the air filtration or circulation unit. The electronic control unit is configured to determine an air control event based on at least one of static air quality information or dynamic air quality information. The electronic control unit is configured to determine that the air control event is within a range of the current location and is approaching. The electronic control unit is configured to activate the air filtration or circulation unit before the air control event reaches the vehicle.

19 Claims, 5 Drawing Sheets

AUTOMATIC AIR QUALITY MONITORING AND IMPROVEMENT SYSTEMS

BACKGROUND

1. Field

This specification relates to a system and a method for circulating, filtering and monitoring air quality in an environment.

2. Description of the Related Art

Air filtration and/or circulation systems have been installed in vehicles and in buildings. An air filtration and/or circulation system monitors, cleans and/or circulates air within an enclosed environment. An air filtration and/or circulation system may remove contaminants from the air to provide comfort and improve health of people in the enclosed environment. The air filtration and/or circulation system may use filters to trap airborne particles, by, for example, size exclusion. Other forms of filtration include the use of ultraviolet (UV) light, thermodynamic sterilization (TSS), ionizers, polarizers and ozone. Additionally, an air filtration and/or circulation system may provide climate control, such as adjusting the air temperature, humidity, etc.

These air filtration and/or circulation systems are typically manually engaged or sometimes engaged in response to detecting contaminants in the air and operate continuously until a user disengages the air filtration and/or circulation system. Thus, these air filtration and/or circulation systems are reactive systems which may initially allow unfiltered and/or uncirculated air into the enclosed environment. Furthermore, in the case of the manual engagement, this requires attention and effort by an operator whose attention could otherwise be focused on other tasks (e.g., driving a vehicle in challenging situations). By allowing some unfiltered and/or uncirculated air to pass, an individual in the enclosed environment may experience an initial discomfort.

Accordingly, there is a need for a system and method to predict and/or anticipate the air quality requirements of a user and, automatically, control air filtration and/or circulation in an environment.

SUMMARY

In general, one aspect of the subject matter described in this specification is embodied in an air control system for an enclosed environment, such as a vehicle. The air control system includes an air filtration or circulation unit for filtering or circulating air. The air control system includes a navigation unit for providing at least one of a navigational map information or environment information. The navigational map information or the environment information includes a current location of the enclosed environment. The air control system includes a processor, such as an electronic control unit, that is connected to the air filtration or circulation unit. The processor is configured to obtain the current location of the enclosed environment. The processor is configured to determine an air control event that is in a path of the vehicle or approaching an enclosed environment based on at least one of static air quality information or dynamic air quality information. The processor is configured to determine that the air control event is within a range of the current location of the enclosed environment and is approaching. The processor is configured to activate the air filtration or circulation unit before the air control event reaches the enclosed environment.

These and other embodiments may optionally include one or more of the following features. The processor may be configured to determine a distance between the current location of the enclosed environment and the location of the air control event where the distance is less than a threshold distance and is decreasing to determine that the air control event is within the range of the current location of the enclosed environment. The processor may be configured to determine that a path of the air control event intersects with the path of the vehicle to determine that the air control event is approaching. The processor may be configured to determine that the air control event is approaching based on at least one of weather condition information or terrain information. The processor may be configured to activate the air filtration unit to filter air entering the enclosed environment and remove particulates from the air until an amount of particulates is less than a threshold amount.

The air control system may include an external database for providing the static air quality information including a location of a hazardous or odorous site or particulate information including pollen data for a particular location. The processor may be connected to the external database. The processor may be configured to obtain the static air quality information including the location of the hazardous or odorous site and determine a perimeter that encloses the hazardous or odorous site. The processor may be configured to associate the air control event with the hazardous and odorous site and a location of the air control event with the perimeter.

The air control system may include a climate control unit. The external database may provide weather information. The processor may be configured to determine the air control event based on the weather information and cause the climate control unit to turn on a heater based on the weather information and activate a window defroster based on the weather information.

The air control system may include a sensor for detecting odors or particulates in air surrounding the enclosed environment. The processor may be configured to determine the air control event based on the odors or particulates detected by the sensor.

In another aspect, the subject matter is embodied in an air control system. The air control system may include an air filtration or circulation unit for filtering or circulating air. The air control system may include a processor connected to the air filtration or circulation unit. The processor may be configured to determine an air control event based on dynamic air quality information including crowd-sourced information. The processor may be configured to determine that the air control event is approaching based on the crowd-sourced information. The air control system may activate the air filtration or circulation unit.

In another aspect, the subject matter is embodied in a method for controlling an air filtration or circulation unit that filters or circulates air within an enclosed environment, such as a vehicle. The method may include determining an air control event based on at least one of static air quality information or dynamic air quality information. The method may include determining that a location of the air control event is within a threshold distance of a current location of the enclosed environment and is decreasing. The method may include activating the air filtration or circulation unit to circulate or filter the air.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for monitoring and/or controlling air quality in an enclosed environment. Particular embodiments of the subject matter described in this specification may be implemented to realize one or more of the following advantages. An air quality control system ("air control system") monitors the quality of the air in an environment and controls the air quality for an enclosed area. The air control system controls at least one of a climate control unit, an air filtration unit and/or an air circulation unit to monitor and control air quality parameters including the air temperature, humidity, amount of contaminants or particulates in the air to provide additional comfort and improve the health of individuals in the enclosed environment.

The air control system predicts oncoming air control events and controls, filters and/or circulates the enclosed air to provide additional comfort and/or improve the health of individuals in an enclosed area, such as in a building or in a vehicle. Moreover, by proactively filtering, circulating and/or controlling the climate, the air control system eliminates the response time a system requires before filtering contaminants in the air. That is, the air control system improves the air quality at a "stand-off" distance. This reduces the amount of contaminants and/or particulates that enter the environment and allows for automatic activation without the need for user interaction. For example, if a vehicle is on fire on a highway, the air control system of an oncoming vehicle may activate an air filtration unit to prevent the smoke from entering the cabin of the vehicle. In another example, as a vehicle approaches a landfill, the air control system may automatically activate to prevent the odors from the landfill from entering the vehicle.

Other benefits and advantages include adjusting the temperature to make the environment more comfortable. For example, if the temperature outside a building is slowly decreasing, the air control system may cause a climate control unit to pre-emptively turn off an air conditioner since the temperature inside the building will naturally cool when the outside temperature decreases. This increases energy efficiency and enhances comfort.

Figure 1:
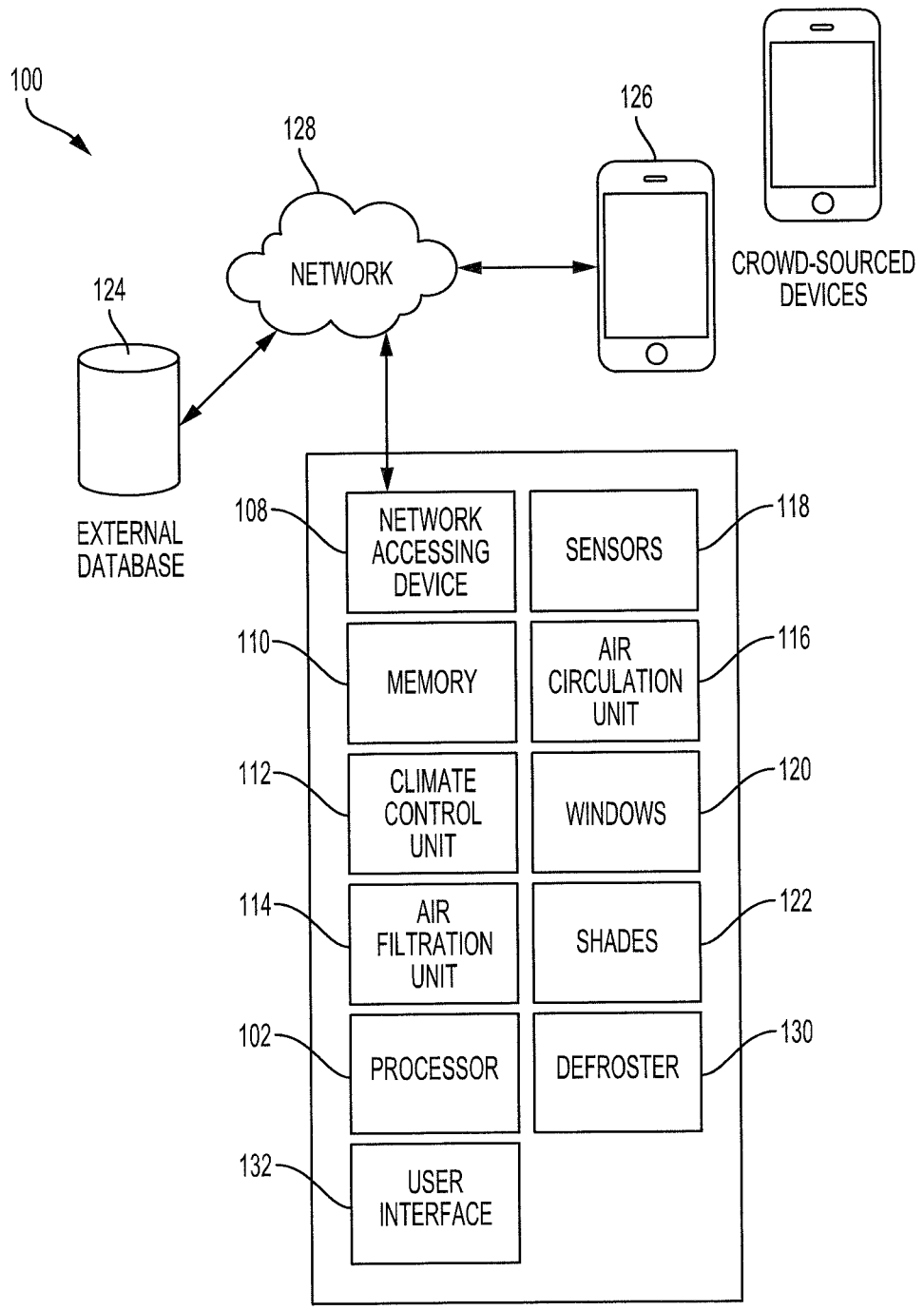
FIG. 1 is a block diagram of an example air quality control system according to an aspect of the invention.
Figure 2:
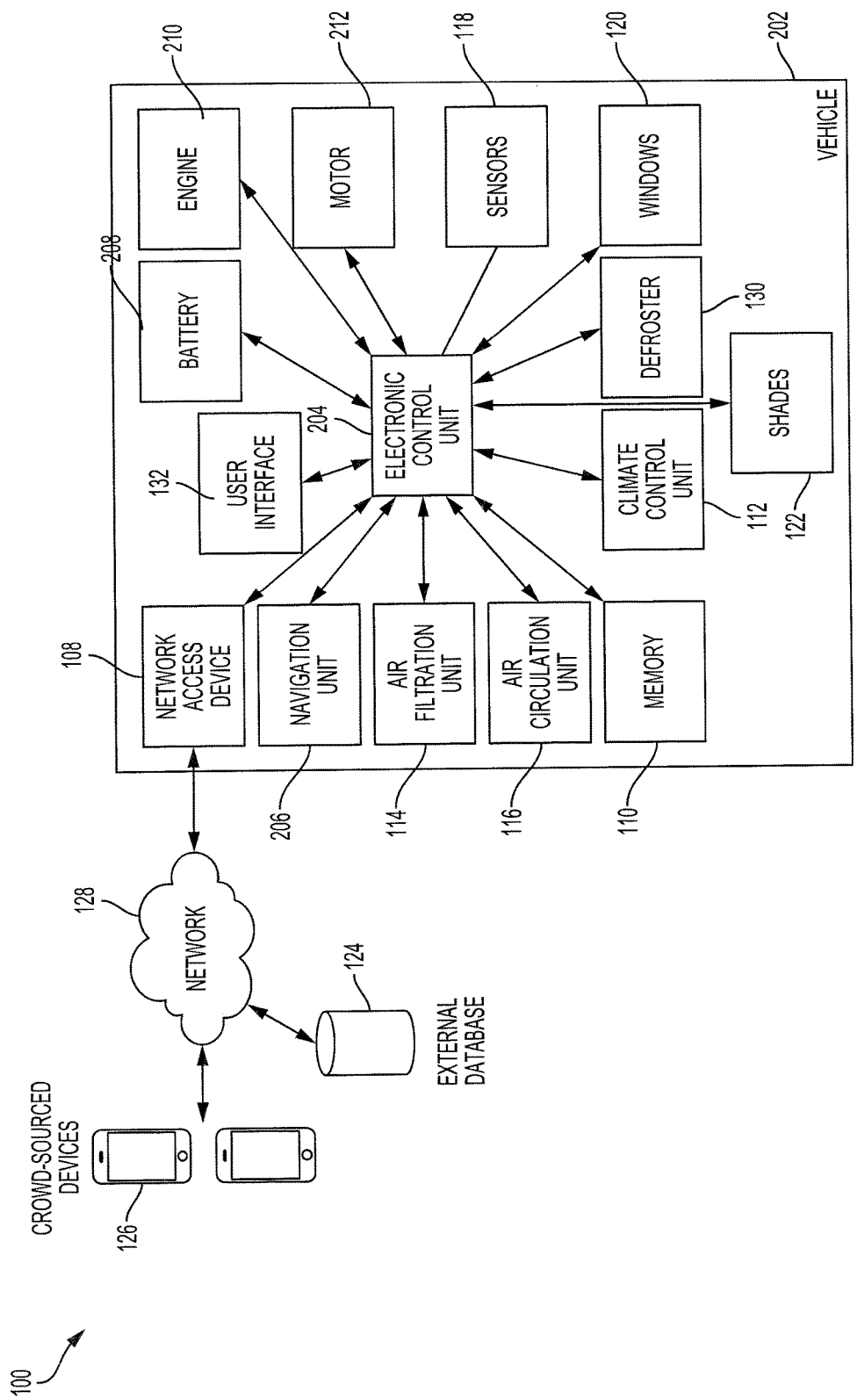
FIG. 2 is a block diagram of the air quality control system integrated within a vehicle according to an aspect of the invention.

FIG. 1 is a block diagram of an example air control system 100. The air control system 100 may include one or more processors 102, such as a data processor, or one or more electronic control units (ECUs) 204 of a vehicle 202, appropriately programmed, to control air filtration or circulation. The air control system 100 may be implemented in a vehicle 202, building, or other enclosed structure that accommodates an air filtration or circulation unit to purify, monitor and/or control the air and/or climate of an environment. FIG. 2 is a block diagram of the air control system 100 integrated into a vehicle 202.

The air control system 100 includes a processor 102, a memory 110 and at least one of a climate control unit 112, an air filtration unit 114 or an air circulation unit 116. The air control system 100 may include a user interface 132, a network access device 108, one or more sensors 118, and one or more adjustable components, such as a window 120, a shade 122 or a window defroster 130.

The air control system 100 may be connected to one or more external databases 124 and/or crowd-sourced devices 126 by a network 128 through the network access device 108. The network 128, such as a local area network (LAN), a wide area network (WAN), a cellular network, a digital short-range communication (DSRC), the Internet, or a combination thereof, connects the air control system 100 to the one or more external databases 124. The external databases 124 may include databases from different service providers. A database is any collection of pieces of information that is organized for search and retrieval, such as by a computer, and the database may be organized in tables, schemas, queries, report, or any other data structures. A database may use any number of database management systems. An external database 124 may include a third-party server or website that stores or provides information. A service provider may provide navigational map information, static air quality information, dynamic air quality information, weather information, traffic condition information and/or terrain information. The information may be real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include terrain information, commercial information and political information. Terrain information includes locations of physical geographic features such as hills, mountains, rivers valleys, coasts and forests. Terrain information may also include elevation or topographical information that may identify terrain features, e.g., hills, mountains, and water bodies. Political information includes political features such as cities, states, roads, highways, on-ramps, off-ramps, bridges, and toll roads. Political information may also include information related to zoning ordinances, laws and regulations, the location of emergency vehicles and other public utility vehicles, and traffic signs or signals. Commercial information may include business and industry information including commercial features, such as utilities, industries and/or businesses.

Static air quality information is information related to air quality in a specific static location of a hazardous and/or odorous site, business or facility that resides regularly and/or continuously at the same location. That is, a location that is known to have persistent air quality issues. A location that has a persistent air quality issue may be a location that averages a particular amount of contaminants and/or particulates in the air above a threshold value, e.g., 55 parts per billion of ozone, over a period of time, e.g. 30 days per year. The hazardous and/or odorous site is likely zoned for industrial and/or agricultural purposes. Different hazardous and/or odorous sites may include landfills, an industrial plant or factory, a ranch or other agricultural land. The hazardous and/or odorous site may also include commercial or residential areas that emit odors, such as restaurants, parks and/or residential garbage areas. The static air quality information may include a location of the hazardous and/or odorous site and a perimeter that represents the distribution of any contaminants and/or odor surrounding the location of the hazardous and/or odorous site. For example, a hazardous and/or odorous site, such as a cattle farm, may have a perimeter of 1 mile surrounding the cattle farm that represents an area where the odor and/or any contaminants surround the cattle farm.

Dynamic air quality information is information related to air quality resulting from a real-time event that does not regularly and/or continuously occur or reside at a particular location. That is, a location that is not known to have a persistent air quality issue. For example, a hazardous spill resulting from a train or truck accident may affect the air quality at the location. The dynamic air quality information may be obtained from crowd-sourced devices 126, such as through Vehicle-to-Vehicle (V2V) or Vehicle-to-Infrastructure (V2I) communications. For example, individual users may post information about a real-time event, such as the hazardous spill, on a social networking site, public feed, or a forum where the air control system 100 obtains the crowd-sourced information. The dynamic air quality information may include a location and a perimeter surrounding the location of the real-time event or other non-persistent air quality issue.

Weather information is information related to weather patterns and/or conditions. The weather information includes wind patterns, such as wind direction and speed, barometric pressure readings, humidity and/or precipitation readings, weather formations, such as storms, and temperature readings.

Traffic condition information is information related to traffic patterns and/or densities. The traffic condition information includes the amount of vehicles located in a particular location and the movement of the vehicles. The greater the density of vehicles in a particular location the larger the amount of contaminants being released as a result of the traffic congestion. The traffic condition information may be obtained from an external database 124 or a crowd-sourcing platform that tracks the movement of vehicles.

The network access device 108 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 108 may transmit data to and receive data from devices and systems not directly connected to the air control system 100.

The air control system 100 and/or the one or more external databases 124 may be connected to one or more crowd-sourced devices 126 through the network 128. A crowd-sourced device 126 includes multiple user devices, such as a laptop, tablet, smartphone or other personal device, which may have an application that allows for a user to share crowd-sourced information on a social network or platform. The air control system 100 may directly or indirectly connect to the social network platform to obtain the crowd-sourced information. The air control system 100 may screen-scrape a website and/or parses a feed to obtain the information. In some implementations, the air control system 100 connects to an application programming interface (API) to obtain the crowd-sourced information.

The air control system 100 includes a memory 110. The memory 110 may store instructions to execute on the processor 102 or the ECU 204 and may include one or more of a RAM or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the processor 102 or the ECU 204. The memory 110 may store the location of air control events.

The air control system 100 includes at least one of a climate control unit 112, an air filtration unit 114 or an air circulation unit 116, The climate control unit 112 controls the climate within the building or the vehicle 202 in which the air control system 100 is located. The climate control unit 112 controls, for example, the temperature and/or humidity of the air within the building or the vehicle. For example, the air control system 100 may cause the climate control unit 112 to raise and/or lower the air temperature by turning on or off a heater and/or air conditioner. The air filtration unit 114 filters the air within the building or the vehicle 202. The air filtration unit 114 may use a number of different technologies including ozone, ultraviolet or size exclusion to filter and/or trap particulates in the air. The air filtration unit 114 may filter air entering the building or the vehicle 202 and/or air that is re-circulated within the building or the vehicle 202. The air circulation unit 116 circulates air within the building or the vehicle 202. The air circulation unit 116 may control a direction and an amount of airflow within the building or the vehicle 202, e.g., by opening and/or closing one or more vents or fans.

The air control system 100 may have a user interface 132. The user interface 132 may be a display or a personal device, e.g., a mobile phone, a tablet, a personal computer, that is connected to the processor 102 or the ECU 204. The user interface 132 may be connected directly to the processor 102 or the ECU 204 or may be connected indirectly through the network access device 108 across a network 128. The user interface 132 may include any device capable of receiving user input, such as a button, a dial, a microphone, or a touch screen, and any device capable of output, such as a display, a speaker, or a refreshable braille display. The user interface 132 allows an occupant to communicate with the processor 102 or the ECU 204. For example, a driver may be able to provide data to the ECU 204 and/or receive feedback from the ECU 204 via the user interface 132.

The air control system 100 may include one or more sensors 118. The one or more sensors 118 may include internal and/or external sensors. Internal sensors are sensors that monitor the environment inside the vehicle 202 or building and may include a temperature sensor to detect the temperature of the air. Other internal sensors may include sensors to detect and/or identify occupants of a vehicle 202 or building, such as a camera. External sensors are sensors that monitor the environment outside the vehicle 202 or building. The external sensors may include a barometric pressure gauge to measure the humidity or precipitation outside the vehicle 202 or building. Other external sensors may include a temperature sensor to measure the temperature, a smog sensor, a pollen indicator, a camera or other contaminant or particulate sensor, such as a sensor to measure smells, methane or carbon dioxide.

The air control system 100 may include one or more adjustable components, such as a window 120, a shade 122 or a window defroster 130. The air control system 100 may control the one or more adjustable components to open, close, turn on, turn off or otherwise tune to a setting. For example, the air control system 100 may slide a window 120 open or close, tint a window, roll up or down a shade 122 or turn the window defroster 130 on or off.

The air control system 100 may be connected to a vehicle 202. The air control system 100 for the vehicle 202 may include a navigation unit 206. A vehicle 202 is a conveyance capable of transporting a person, an object, or a permanently or temporarily affixed apparatus. A vehicle 202 may be a self-propelled wheeled conveyance, such as a car, sports utility vehicle, truck, bus, van or other motor or battery driven vehicle. For example, the vehicle 202 may be an electric vehicle, a hybrid vehicle, a plug-in hybrid vehicle or any other type of vehicle that includes a motor and/or generator. Other examples of vehicles include bicycles, trains, planes, or boats, and any other form of conveyance that is capable of transportation. The vehicle 202 may be semi-autonomous or autonomous. That is, the vehicle 202 may be self-maneuvering and navigate without human input. An autonomous vehicle may use one or more sensors 118 and/or navigation units 206 to drive autonomously.

The navigation unit 206 may be coupled to the ECU 204 and provide environment information and/or navigation information to the ECU 204. The environment information may include the current location, direction and/or speed of the air control system 100. The navigation information may include a route that the vehicle 202 is or will be travelling. The route may include a starting location, a destination location and/or a path between the starting location and the destination location.

The vehicle 202 may include an engine 210, a motor and/or generator 212, and battery 208. The motor and/or generator 212 may be an electric motor and an electric generator that converts electrical energy into mechanical power, such as torque, and converts mechanical power into electrical energy. The motor and/or generator 212 may be coupled to the battery 208. The motor and/or generator 212 may convert the energy from the battery 208 into mechanical power, and may provide energy back to the battery 208, for example, via regenerative braking. The engine 210 combusts fuel to provide power instead of and/or in addition to the power supplied by the motor and/or generator 212.

The battery 208 may be coupled to the motor and/or generator 212 and may provide electrical energy to and receive electrical energy from the motor and/or generator 212. The battery 208 may include one or more rechargeable batteries.

Figure 3:
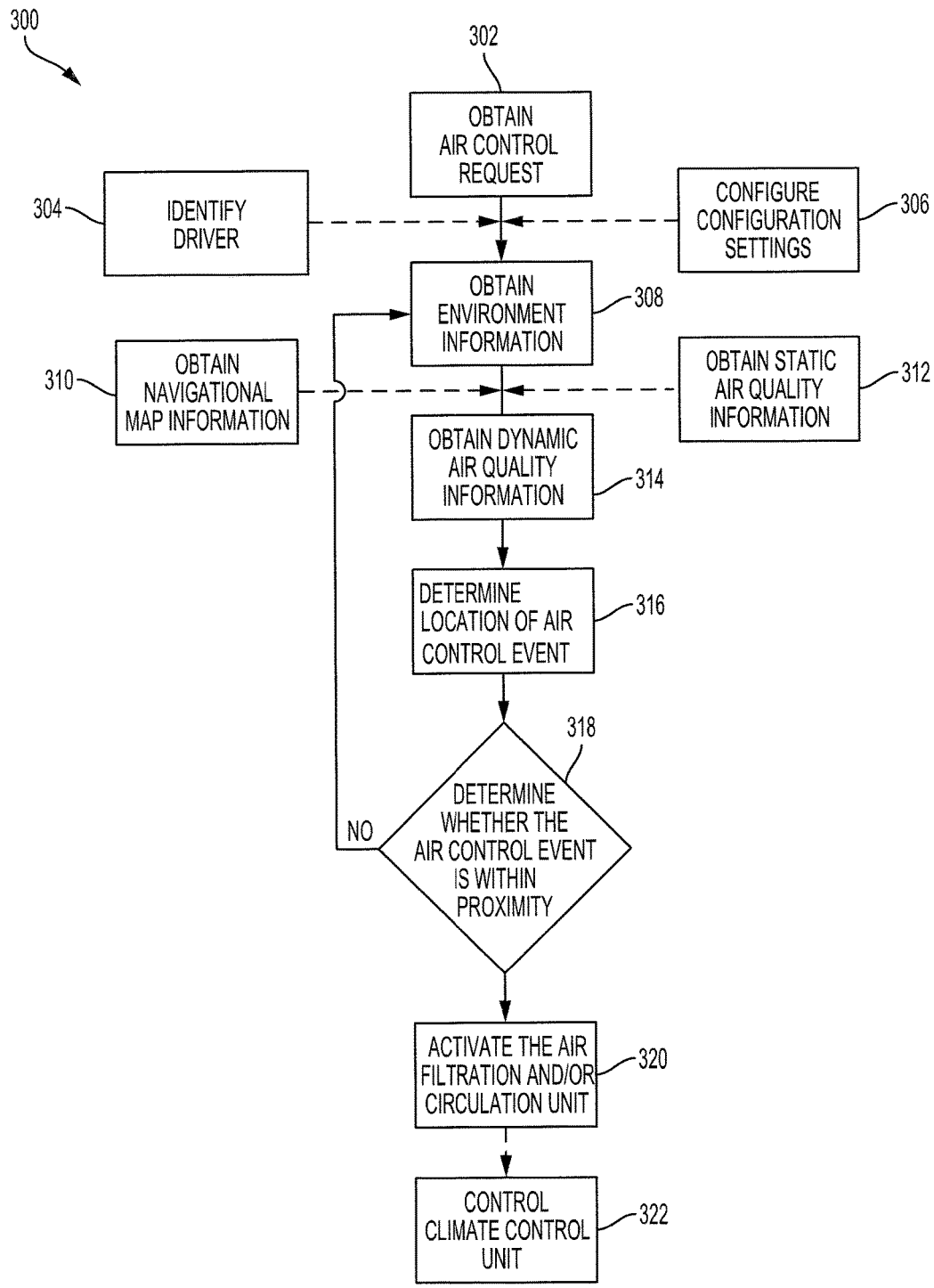
FIG. 3 is a flow diagram of an example process for improving air quality and air flow according to an aspect of the invention.

FIG. 3 is a flow diagram of an example process 300 for improving air quality and air flow. One or more computers or one or more processors 102, e.g., the ECU 204, of the air control system 100, appropriately programmed, may implement the process 300 within a building or a vehicle 202.

The air control system 100 obtains an air control request (302). The air control request is a request to initialize the air control system 100. The air control request may include an identity of any users including any occupants of the building or the vehicle 202 that that uses the air control system 100. Users may include a driver or passenger of a vehicle 202, an occupant of a building, or any other persons residing in an environment controlled by the air control system 100. The air control request may include one or more default configuration settings for the air control system 100. The air control system 100 may receive the air control request when the vehicle 202 becomes operational or when a user activates the air control system 100, for example, when a token, such as a key, is inserted to start the vehicle 202 or from a user interface 132. The air control system 100 may receive the air control request from one or more sensors 118, such as an engine sensor, when the vehicle 202 is powered on.

The air control system 100 may determine an identity of a user during initialization (304). The air control system 100 may obtain the identity of a user from the air control request. The air control system 100 may receive user input, such as a user identification token, a user id or a fingerprint, which identifies the user. For example, a driver's key fob may uniquely identify the driver when the driver opens the door or is within proximity of the vehicle 202. In another example, the air control system 100 may obtain a user id from the user, using the user interface 132, to identify the user. The air control system 100 may use other user interface elements or sensors, such as a camera that uses facial recognition, or a combination of devices and/or techniques to identify users.

The air control system 100 configures one or more configuration settings (306). The one or more configuration settings may be based on the identity of the user. The one or more configuration settings may establish thresholds and/or values for various air control and/or filtration settings. The air control and/or filtration settings may identify a temperature for the air, a rate at which the air flows, a direction in which the air circulates and/or ventilates, an amount of allowable particulates within the air, or the use of a particular form of filtration when filtering and/or circulating air flow. The air control system 100 may associate the identified users with one or more configuration settings and store the identified users along with the associated one or more configuration settings in a user profile.

The air control system 100 may obtain the environment information (308). The environment information includes a current location for the air control system 100. The environment information may include a current speed and direction of the vehicle 202 if the air control system 100 is integrated with the vehicle 202. The air control system 100 may obtain the environment information, from the navigation unit 206, if the air control system 100 is integrated with a vehicle 202. The air control system 100 may obtain the environment information from a network 128, e.g., by triangulating a wireless signal, or a global positioning system (GPS) device. For example, the navigation unit 206 may include a GPS device that may track and provide a current location of the vehicle 202 and/or a current speed of the vehicle 202.

The air control system 100 may obtain the navigational map information from the one or more external databases 104 (310). Navigational map information may include terrain information, commercial information and political information. Different terrains, commercial and/or political features affect the amount, distribution and direction of contaminants, particulates and/or odors that impact air quality that may travel to the current location of the vehicle 202 or the building.

The air control system 100 may obtain static air quality information (312). The air control system 100 may extract the static air quality information from the navigational map information and/or obtain the static air quality information from the one or more external databases 124. The static air quality information may include location information for one or more locations that have a persistent air quality issue. For example, the navigational map information may identify one or more commercial and/or political features. The one or more features that emit a persistent odor and/or contaminants may be may be a large city, such as Beijing, China, an industrial complex, such as a coal plant, and/or an animal farm. The air control system 100 may compare the one or more features with a database of different categories of types of locations that have a persistent air quality issue to identify one or more locations of the features that may have a persistent air quality issue. The different categories may include landfills, cities, industrial areas, such as factories or utility plants, and/or agricultural areas, such as farms, ranches, and/or pastures. The air control system 100 may match a category to the one or more locations, and if a category is matched to the feature the location may be determined to have a persistent air quality issue.

In some implementations, the air control system 100 may be configured such that geographic areas with a known amount of contaminants or particulates per square mile or area may be designated as a location with a persistent air quality issue. The amount of contaminants or particulates may be obtained from sensor data or from a database.

The air control system 100 obtains dynamic air quality information (314). The dynamic air quality information includes location information for one or more locations that have a non-persistent air quality issue. The non-persistent air quality issue may result from an irregular, unanticipated or one-time event, such as a fire, hazardous material spill, traffic or natural occurrence. The location information may include a starting location, a current location, a direction and/or speed of travel for the non-persistent air quality issue. Dynamic air quality information may include traffic condition information and/or pollen information.

The air control system 100 may obtain the dynamic air quality information by monitoring crowd-sourced information, such as feeds, websites, social networking sites, mobile applications or other crowd-sourcing devices. For example, the air control system 100 may screen-scrape a forum on a website for keywords, such as "spill," "smog," "pollen" or other words indicative of contaminants and/or particulates, to obtain updates about the amount of smog, contaminants and/or pollen in the air surrounding and/or enclosed within a city to determine whether the area has a non-persistent air quality issue. In another example, the air control system 100 may directly connect through an application programming interface to share, request and/or receive dynamic air quality information from other crowd-source devices.

The air control system 100 may obtain the dynamic air quality information from one or more sensors 118 or a report from an external database 124. For example, the air control system 100 may obtain pollen data from the one or more sensors 118 or the external database 124. If the pollen level is greater than 90 spores or grains per cubic meter of air, the air control system 100 may designate the area of the pollen as a non-persistent air quality issue. In another example, the air control system 100 may obtain traffic condition information and identify areas with a high density of vehicles as a non-persistent air quality issue.

The air control system 100 may aggregate dynamic air quality information from different sources to determine the direction and/or speed of travel of the non-persistent air quality issue. The air control system 100 may include a severity for the non-persistent air quality issue. For example, the air control system 100 may obtain a first feed that describes a fire at a first location. The air control system 100 may obtain a second feed a few minutes later that describes the fire spreading to a second location. The air control system 100 may determine from the first feed and the second feed that the fire has spread to the second location and that the fire has grown in severity resulting in an increase in contaminants. The air control system 100 may determine the speed that the fire has spread based on a timestamp of the feeds and the distance between first and second locations.

The air control system 100 determines a location of one or more air control events based on the dynamic air quality information and/or the static air quality information (316). The air control system 100 may determine the location of the one or more air control events using the dynamic air quality information, the static air quality information or a combination of both. An air control event is either a persistent or non-persistent air quality issue. The air control system 100 extracts the location of one or more persistent and/or non-persistent air quality issues from the dynamic air quality information and/or the static air quality information to use as the location of the one or more air control events.

The location of the one or more air control events may include a perimeter surrounding the one or more air control events that represents, for example, a plume or cloud of contaminants. The plume may be shaped as a circle or an ellipse or may be a variable shape that is affected by weather patterns including wind direction, wind speed and precipitation. Hereinafter, the location of the one or more air control events may refer to either the actual location of the one or more air control events or a perimeter of a plume surrounding the one or more air control events.

The air control system 100 determines whether the air control event is within a threshold distance and approaching (318). The threshold distance may be a threshold time, e.g., a few minutes, before the air control event reaches the vehicle 202 or the building. The air control system 100 activates when the air control event is within the threshold distance, e.g., within 2 miles when there is no wind. That is, when the location of the air control event or the perimeter of the air control event is within proximity or a threshold distance of the current location of the vehicle 202 or the building. The threshold distance may be a predetermined distance, a distance configured by a user or determined based on the identity of the user before the air control event reaches a current location of the vehicle 202 or the building.

The threshold distance may be adjusted based on weather information. For example, the threshold distance may be increased when the outside temperature is higher, e.g., above 90 degrees Fahrenheit, or when the wind speed is greater, e.g., above 5 mph, to account for an increase in severity of the air control event due to weather patterns.

The air control event is approaching when the air control event is in the path of the vehicle 202, traveling toward the building or intersects the path of the vehicle 202. In some implementations, the air control event is approaching if the relative distance between the air control event and vehicle 202 or building is decreasing. The air control system 100 may determine that the relative distance between the location of the air control event and the vehicle 202 or the building is decreasing by calculating the distance between the two locations at a first and a second time.

The air control system 100 activates an air filtration and/or circulation unit (320). The air control system 100 may activate the air filtration unit 114 or the air circulation unit 116 based on the air control event and/or the user profiles associated with the identified users of the air control system 100. That is, the air control system 100 may enter a particular mode, such as air circulation mode, air filtration mode, and/or climate control mode and a enter a particular setting, such as low, normal or high based on the user profile and/or the air control event. The air control system 100 may activate based on the profile of the most sensitive user which results in the air control system 100 activating the air filtration and/or circulation unit at the greatest "stand-off" distance among the users.

For example, if the approaching air control event that is approaching the vehicle 202 is a cloud of smog, the air control system 100 may activate the air filtration unit 114 to remove the contaminants from the air. If the air control system identified that "John Doe" who has severe asthma is in the vehicle 202, the air control system 100 may set the air filtration unit to a maximum setting, whereas, if "Jane Doe" who is healthy is in the vehicle and "John Doe" is not present, the air control system 100 may set the air filtration unit to a normal setting.

The air filtration and/or circulation unit may remain activated until after the air control event leaves the proximity of the vehicle 202 or the building or the level of the contaminants and/or particulates decreases below a threshold value. The level of the contaminants and/or particulates may be measured by one or more sensors 118.

Figure 4:
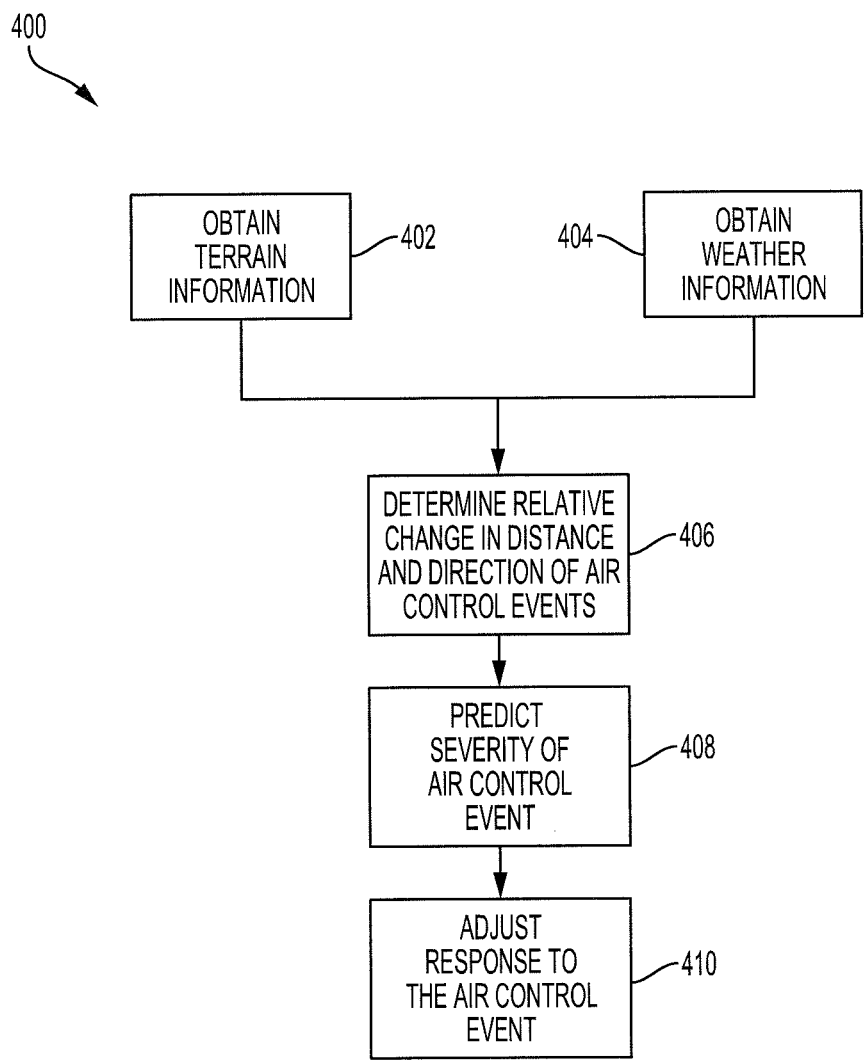
FIG. 4 is a flow diagram of an example process for adjusting a response to an air control event according to an aspect of the invention.

The air control system 100 may control a climate control unit 112 in response to the air control event approaching and being within a threshold distance (322). The climate control unit 112 may control, for example, the temperature and/or the humidity within the vehicle 202 or the building. For example, if there is a heat wave or a cool wave approaching the vehicle 202 or the building, the air control system 100 may lower or raise the temperature using an air conditioner or heater, respectively, to provide comfort to the users. FIG. 4 further describes the process for adjusting a response to an air control event that is approaching the vehicle 202 or the building.

In some implementations, the air control system 100 may activate or control other adjustable components including the windows 120, shades 122 and/or window defroster 130 to provide air circulation and/or climate control. The air control system 100 may control the other adjustable components based on the air control event and/or weather information. For example, the air control system 100 may open a window 120 to lower the temperature or close the window 120 to prevent contaminants from entering. In another example, the air control system 100 may turn on a window defroster 130 if the weather information indicates that rain or other precipitation is approaching. In another example, the air control system 100 may send a notification through the user interface 132 to notify the users of the air control event.

FIG. 4 is a flow diagram of an example process 400 for adjusting a response to an air control event. One or more computers or one or more processors 102, for example, the ECU 204 of the air control system 100, appropriately programmed, may implement the process 400.

The air control system 100 may obtain terrain information (402). The air control system 100 may extract the terrain information, such as the location of hills, valleys or other terrain features, from the navigational map information. In some implementations, the air control system 100 obtains the information from the one or more external databases 124, e.g., through a map service, or from one or more sensors 118, such as a road incline sensor that detects the level of incline of a roadway that the vehicle 202 is travelling.

The air control system 100 may obtain weather information (404). The weather information includes weather patterns, such as precipitation, wind direction, wind speed and humidity, that affect the movement and severity of contaminants within the air. For example, a thunderstorm may remove contaminants from the air or the wind may divert the contaminants in a direction toward or away from the vehicle 202 or building. The air control system 100 may obtain the weather information from one or more external databases 124 or from one or more sensors 118.

The air control system 100 may determine the relative change in distance, direction or duration of an air control event based on the terrain information and/or weather information (406). The terrain information may be used to determine the relative distance, direction or duration of the air flow event approaching the vehicle 202 or the building. For example, an air control event, such as smog in a large downtown city that is located in a valley, may accumulate within a valley and may not be blown by the wind toward the direction of a vehicle 202 that is driving on the outskirts of the valley. The valley may trap the smog in a confined area so that the vehicle 202 driving on the outskirts of valley is not exposed to the smog even though the vehicle 202 is adjacent to the smog. In another example, the air control system 100 may anticipate that an air control event is approaching the vehicle 202 more quickly if the air control event is being blown by the wind in the direction of the vehicle 202 or building and so the air control system 100 may begin filtering and/or circulating air at a greater threshold distance. If however, the air control event is being blown by the wind away from the vehicle 202, the air control system 100 may delay or cancel filtering and/or circulating the air to save energy.

The air control system 100 may determine the severity of the air control event based on the static air quality information, the dynamic air quality information, the weather information and/or the terrain information (408). The air control system 100 may extract the severity of the air control event from the static air quality information and/or dynamic air quality information. The air control system 100 may adjust the severity of the air control event based on the weather information and/or the terrain information.

For example, the static air quality information may indicate that a utility plant releases approximately a few metric tons of soot into the air daily. The air control system 100 may use weather information obtained to determine that the wind direction blows the cloud of soot from the utility plant through a thunderstorm before reaching the vehicle 202. Thus, the severity of the cloud of soot may be reduced after passing through the thunderstorm. In another example, if the terrain is a valley, the valley may trap contaminants within a particular area causing the air control event to remain within the particular area which may exacerbate or increase the severity of the air control event. Moreover, humid air and/or a high temperature may increase the severity of contaminants in an area.

In response to the predicting or determining the distance, direction and severity of the air control event, the air control system may adjust the air filtration unit 114, climate control unit 112, and/or air circulation unit 116 (410). For example, if the air control event is severe, the air control system 100 may activate the air filtration unit 114 sooner to begin filtering the air, e.g., by increasing the threshold distance in which to activate the air control system 100.

Figure 5:
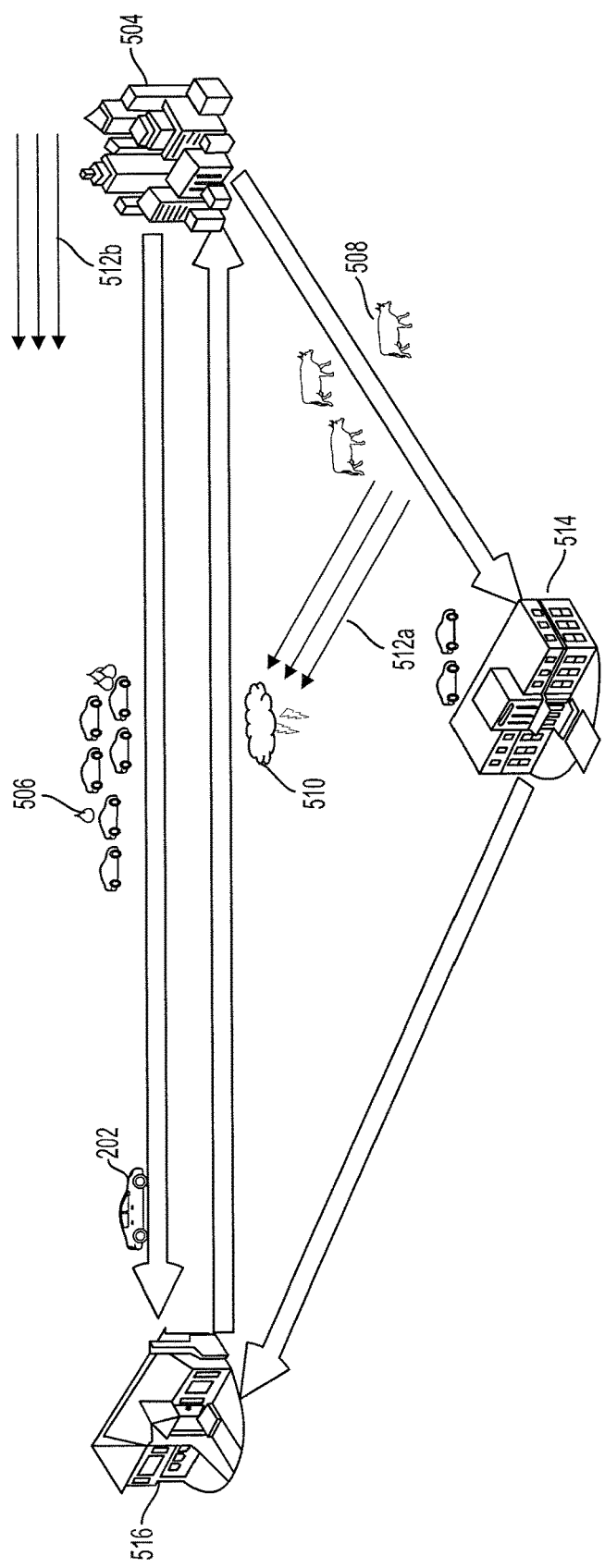
FIG. 5 is an illustration of an example route traveled by a vehicle that encounters an air control event.

FIG. 5 shows an example map 500 of a route traveled by the vehicle 202 of FIG. 2. Map 500 illustrates various routes traveled by the vehicle 202. The air control system 100 may be installed in either the vehicle 202 or the building 516. As shown the vehicle 202 travels from a building 516 to a city 504. When the vehicle 202 travels to the city 504, there may be traffic 506. The air control system 100 of the vehicle 202 or the building 516 may obtain dynamic air quality information from a server that indicates that there is an air control event at the location of the traffic 506 because a vehicle is on fire or because there is significant traffic congestion. The server may have obtained the information that the vehicle is on fire or that there is traffic congestion from crowd-sourced devices, such as drivers in the traffic 506 posting pictures of the vehicle fire.

Additionally, the air control system 100 may obtain static air quality information that indicates that there is an air control event at the location of the city 504, the location of the cattle ranch 508 and the location of the factory 514. The air control system 100 may obtain weather information that indicates the direction of the wind 512*a-b* and the location of the storm 510. The air control system 100 may disregard, at present, the air control event associated with the cattle ranch 508 and/or factory 514 because the wind 512*a* will blow the odors from the cattle ranch 508 and/or the contaminants from the factory 514 into the path of the storm 510 which may prevent the odors and/or contaminants from reaching the vehicle 202 or the building 516. The air control system 100 may increase the threshold distance at which the air control system 100 activates the air filtration unit 114 and/or air circulation unit 116 because the wind 512*b* will blow the contaminants from the traffic 506 and the city 504 toward the building 516 and the vehicle 202 at a faster rate. Thus, the air control system 100 adjusts when to activate the air filtration unit 114 and/or air circulation unit 116 based on the weather information, the static air quality information and/or the dynamic air quality information.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An air control system of a vehicle, comprising:
   an air filtration or circulation unit configured to filter or circulate air;
   a navigation unit configured to determine a route of the vehicle that includes a current location of the vehicle; and
   an electronic control unit connected to the air filtration or circulation unit, the electronic control unit configured to:
      obtain, from the navigation unit, the route of the vehicle,
      determine an air control event that is in the route of the vehicle based on at least one of static air quality information or dynamic air quality information,
      determine a relative distance between the current location of the vehicle and a location of the air control event,
      determine that the air control event is within a range of the current location of the vehicle and is approaching based on the relative distance,
      activate the air filtration or circulation unit before the air control event reaches the vehicle, and
      keep the air filtration or circulation unit activated until after the vehicle leaves the location of the air control event.

2. The air control system of claim 1, wherein to determine the air control event is within the range of the current location of the vehicle and is approaching, the electronic control unit is further configured to:
   determine that the relative distance is less than a threshold distance;
   determine that the relative distance between the vehicle and the air control event is decreasing; and
   determine that a path of the air control event intersects with the route of the vehicle.

3. The air control system of claim 1, further comprising:
   an external database configured to provide the static air quality information including a location of a hazardous or odorous site or particulate information including pollen data for a particular location;
   wherein the electronic control unit is connected to the external database through a network.

4. The air control system of claim 3, wherein the electronic control unit is configured to:
   obtain, from the external database, the static air quality information including the location of the hazardous or odorous site;
   determine a perimeter surrounding the hazardous or odorous site; and
   associate the air control event with the hazardous or odorous site and the location of the air control event with the perimeter surrounding the hazardous or odorous site.

5. The air control system of claim 1, wherein to activate the air filtration or circulation unit the electronic control unit is configured to:
   activate the air filtration or circulation unit to filter air entering the vehicle and remove particulates from the air until an amount of particulates is less than a threshold amount.

6. The air control system of claim 1, further comprising:
   a sensor configured to detect odors or particulates in air surrounding the vehicle;
   wherein the electronic control unit is connected to the sensor and is configured to:
      determine the air control event based on the odors or particulates detected by the sensor.

7. The air control system of claim 1, wherein the electronic control unit is configured to determine that the air control event is approaching based on at least one of weather condition information or terrain information.

8. The air control system of claim 1, further comprising:
   an external database configured to provide weather information;
   a climate control unit configured to control an internal vehicle temperature;
   wherein the electronic control unit is configured to connect to at least one of the external database or the climate control unit and is configured to:
      determine the air control event based on the weather information, and
      cause the climate control unit to turn on a heater or an air conditioner based on the weather information.

9. The air control system of claim 8, wherein the electronic control unit is configured to activate a window defroster based on the weather information.

10. An air control system of an enclosed environment, comprising:
    an air filtration or circulation unit configured to filter or circulate air; and
    a processor connected to the air filtration or circulation unit, the processor configured to:
       determine an air control event based on dynamic air quality information including crowd-sourced information,
       determine a distance between a current location of the enclosed environment and a location of the air control event,
       determine that the air control event is approaching based on the crowd-sourced information and the distance, activate the air filtration or circulation unit before the air control event reaches the current location of the enclosed environment; and keep the air filtration or circulation unit activated until after the air control event leaves the current location of the enclosed environment.

11. The air control system of claim 10, further comprising:
an external database that provides weather information;
wherein the processor is connected to the external database through a network and is configured to determine that the air control event is approaching further based on the weather information.

12. The air control system of claim 11, wherein the air control system is configured to open, close or defrost a window based on the weather information in response to determining that the air control event is approaching.

13. The air control system of claim 10, wherein the dynamic air quality information includes pollen data, wherein the air control event is pollen-filled air that exceeds a threshold amount of pollen.

14. The air control system of claim 13, wherein to activate the air filtration or circulation unit the processor is configured to cause the air filtration or circulation unit to filter the pollen-filled air until an amount of pollen in the air is less than the threshold amount.

15. The air control system of claim 10, wherein the crowd-sourced information includes direction and speed information of a non-persistent air quality issue.

16. The air control system of claim 15, wherein the non-persistent air quality issue relates to a fire, an accident or other irregular incident.

17. A method for controlling an air filtration or circulation unit that filters or circulates air within a vehicle, comprising:

determining, by a processor, an air control event based on at least one of static air quality information or dynamic air quality information;

determining, by the processor, a perimeter surrounding the air control event;

determining, by the processor, that a current location of the vehicle is within a threshold distance of the perimeter surrounding the air control event;

activating, by the processor, the air filtration or circulation unit to circulate or filter the air before the current location of the vehicle is within the threshold distance of the perimeter surrounding the air control event; and keeping activated, using the processor, the air filtration or circulation unit until after the vehicle leaves the perimeter surrounding the air control event.

18. The method of claim 17, wherein the static air quality information includes a location of a hazardous or odorous site, wherein the air control event is the hazardous or odorous site and the perimeter surrounds the hazardous or odorous site.

19. The method of claim 17, further comprising:
obtaining, from a sensor or a user interface, an identity of a driver or a passenger of the vehicle, wherein activating the air filtration or circulation unit is further based on the identity of the driver or the passenger.

* * * * *